(No Model.)
P. BURKE.
FISHPOLE HOLDER.
No. 525,132.  Patented Aug. 28, 1894.
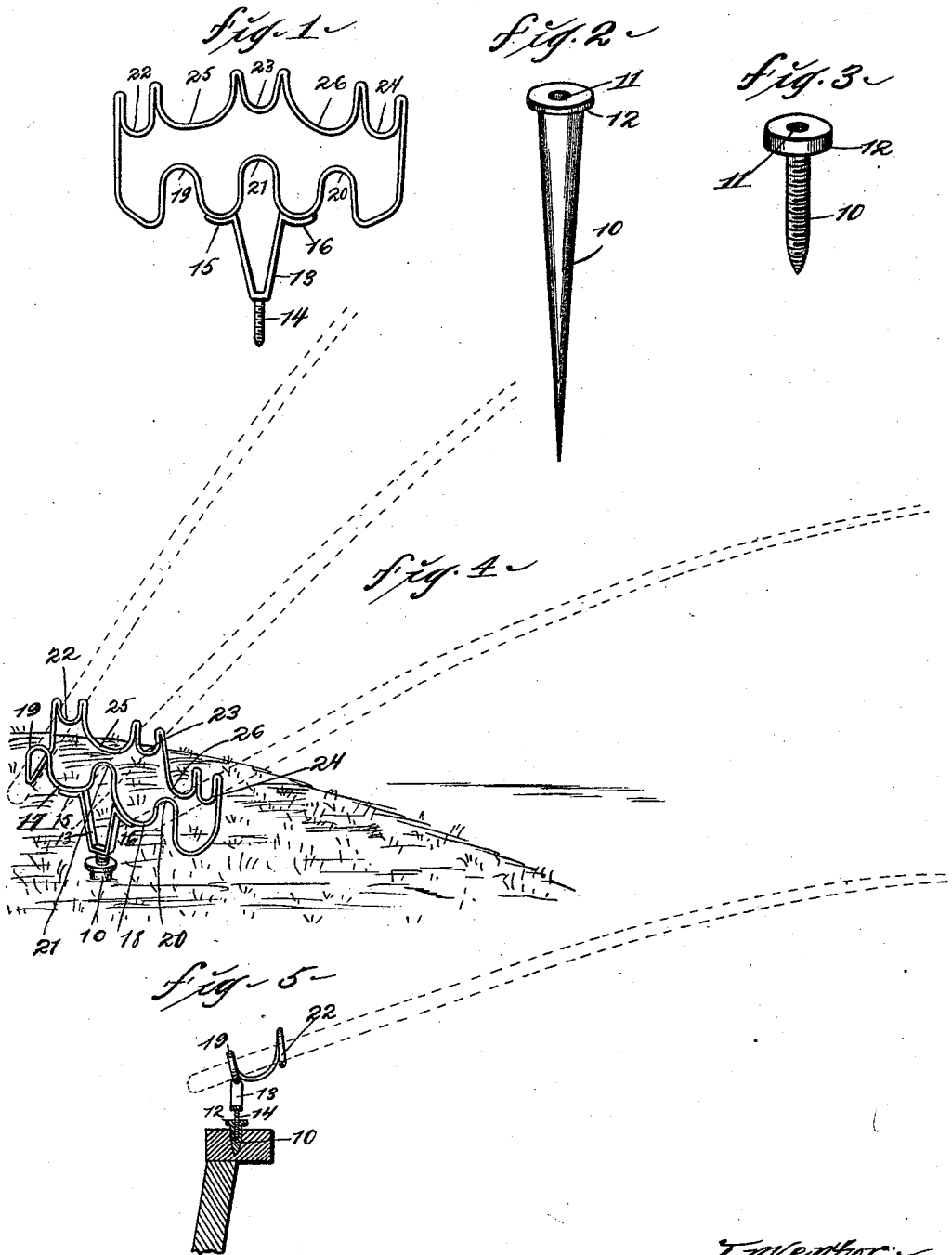
Attest:
M. P. Smith
J. C. Swek
Inventor:
Patrick Burke
By Higdon & Higdon & Longan
Att'ys

UNITED STATES PATENT OFFICE.

PATRICK BURKE, OF ST. LOUIS, MISSOURI.

FISHPOLE-HOLDER.

SPECIFICATION forming part of Letters Patent No. 525,132, dated August 28, 1894.

Application filed April 23, 1894. Serial No. 508,578. (No model.)

*To all whom it may concern:*

Be it known that I, PATRICK BURKE, of the city of St. Louis, State of Missouri, have invented certain new and useful Improvements in Fishpole-Holders, of which the following is a full, clear, and exact description, reference being had to the accompanying drawings, forming a part hereof.

The object of this invention is to provide improved means for retaining a fish pole in an inclined plane and supporting the same in a plane above the water in which a line attached to said pole is cast.

This invention consists in the combination of a socket adapted to be fixed in the ground or other suitable support and a notched wire frame mounted in said socket and adapted to receive and retain the fish pole.

This invention consists further in the construction, arrangement and combination of parts hereinafter set forth and claimed.

Referring to the drawings Figure 1 is a front elevation of the wire frame detached from the socket. Fig. 2 is a perspective view of a socket adapted for insertion in the earth. Fig. 3 is a perspective view of a socket adapted for insertion in a hard substance, such as a boat. Fig. 4 is a perspective view showing my device in position for practical use on land. Fig. 5 is a sectional elevation showing my device in position for practical use on a boat.

In the construction of the device as shown the numeral 10 designates a socket having a long slender taper and adapted for insertion in the ground as shown in Fig. 4, which said socket is provided with an axial screw-threaded aperture 11 and an annular horizontal marginal flange 12. On the upper end thereof, a bifurcated standard 13 is provided, to the lower end of which standard is secured a stem 14 screw-threaded and adapted for seating in the screw-threaded bore 11 of the socket.

Integrally formed with and laterally extending from the upper end portions of the arms of the bifurcated standard 13 are concaved supporting arms 15, 16.

The supporting frame is made of a single length of wire and is so formed as to present a rectangular appearance in plan view. One side of the frame is provided with downwardly concaved portions 17, 18, adapted to rest upon and be rigidly secured to the concaved upper surfaces of the arms 15, 16, and upwardly concaved portions 19, 20, and 21, on either side of and between the downwardly concaved portions 17, 18, the forward portion of the frame is provided with downwardly concaved portions 22, 23, and 24, within which portions the fish pole shown in dotted lines, is adapted to rest, the end of the fish pole being retained against vertical movement by the portions 19, 20, and 21. The forward side of the frame is longer than the rear side thereof and downwardly concaved portions 25, 26, are formed in said forward portion between the portions 22, 23, and 23, 24.

In the construction of the device to be employed with a boat or wooden support, the socket 10 is exteriorly screw-threaded, and has approximately parallel sides, is provided with a marginal flange 12, an axial screw-threaded bore 11, within which bore a standard 13 is supported.

It will be observed that the fish poles when positioned in the supported frame, occupy diverged incline planes providing for the casting of the lines secured thereto at maximum distances of separation.

It is obvious that the sockets may be seated in planes inclined relative to the vertical, thus adjusting the horizontal plane of the fish pole relative to the surface over which they are projected.

What I claim is—

1. A support for fish poles comprising a socket having a screw-threaded axial bore, a standard having a stem exteriorly screw-threaded and adapted for seating in said bore, and a supporting frame made of a single length of wire and provided with rests and retaining arches whereby a series of poles are supported and rigidly secured to said standard.

2. In a device of the class described, a socket having a marginal flange and a screw-threaded axial bore, a bifurcated standard having a stem adapted for seating in said bore, and laterally extending supporting arms, a supporting frame having rests and retaining arches, which supporting frame is rigidly mounted upon the supporting arms.

3. In a device of the class described, an exteriorly screw-threaded socket having an axial screw-threaded bore, a standard mounted in said bore and a supporting frame mounted on said standard.

In testimony whereof I affix my signature in presence of two witnesses.

PATRICK BURKE.

Witnesses:
S. C. SWEET,
JNO. C. HIGDON.